United States Patent [19]

Suzuki et al.

[11] Patent Number: 5,298,931

[45] Date of Patent: * Mar. 29, 1994

[54] ELECTRONIC STILL CAMERA

[75] Inventors: Nobuharu Suzuki; Tahei Morisawa; Makoto Mogamiya, all of Tokyo, Japan

[73] Assignee: Asahi Kogaku Kogyo Kabushiki Kaisha, Tokyo, Japan

[ * ] Notice: The portion of the term of this patent subsequent to Nov. 26, 2008 has been disclaimed.

[21] Appl. No.: 833,614

[22] Filed: Feb. 13, 1992

Related U.S. Application Data

[63] Continuation of Ser. No. 416,979, Oct. 4, 1989, abandoned.

[30] Foreign Application Priority Data

Oct. 4, 1988 [JP] Japan .............................. 63-250271

[51] Int. Cl.$^5$ .............................................. G03B 13/08
[52] U.S. Cl. ....................................................... 354/225
[58] Field of Search ................................ 354/219–225, 354/195.1, 195.12; 358/909

[56] References Cited

U.S. PATENT DOCUMENTS

| | | | |
|---|---|---|---|
| 2,526,144 | 10/1950 | Lawrence et al. | 354/219 |
| 3,921,189 | 11/1975 | Gallistel | 354/225 |
| 4,032,938 | 6/1977 | Karikawa et al. | 354/225 |
| 4,057,830 | 11/1977 | Adcock . | |
| 4,081,809 | 3/1978 | Kuboshima | 354/219 |
| 4,131,354 | 12/1978 | Hagiwara | 354/224 |
| 4,545,655 | 10/1985 | Fantone et al. | 354/225 |
| 4,725,130 | 2/1988 | Ozawa . | |
| 4,853,785 | 8/1989 | Ovshinsky et al. | 358/909 |
| 4,894,672 | 1/1990 | Tanaka | 354/195.12 |
| 4,942,414 | 7/1990 | Takahashi et al. | 354/195.12 |
| 4,944,030 | 7/1990 | Haraguchi et al. | 354/195.12 |
| 5,012,273 | 4/1991 | Haraguchi et al. | 354/195.1 |
| 5,016,032 | 5/1991 | Haraguchi et al. | 354/195.1 |
| 5,068,678 | 11/1991 | Mogamiya et al. | 354/199 |

FOREIGN PATENT DOCUMENTS

| | | |
|---|---|---|
| 2634142 | 4/1977 | Fed. Rep. of Germany . |
| 55-36811 | 3/1980 | Japan . |
| 55-46729 | 4/1980 | Japan . |
| 8707036 | 11/1987 | PCT Int'l Appl. . |
| 8707038 | 11/1987 | PCT Int'l Appl. . |
| 365330 | 1/1932 | United Kingdom . |
| 521452 | 5/1940 | United Kingdom . |
| 538744 | 8/1941 | United Kingdom . |
| 2224359 | 5/1990 | United Kingdom . |

OTHER PUBLICATIONS

Abstract 55-38611, Telephoto Lens with High Magnification Finder Mar. 14, 1980.
Abstract 55-46729, Finder Optical System Apr. 2, 1980.

*Primary Examiner*—David M. Gray
*Attorney, Agent, or Firm*—Sandler Greenblum & Bernstein

[57] ABSTRACT

An electronic still camera having a photographing system, a photographing element located at a surface of the photographing optical system on which an image is formed and a finder optical unit disposed separately from the photographing optical system. An optical path of the finder optical unit includes a forward optical path disposed parallel to and close to the photographing optical system, a rearward optical path disposed at a position away form an optical axis of the photographing optical system farther than the forward optical path and a deflected optical path for connecting the forward optical path to the rearward optical path and disposed at a position forward of the photographing element.

19 Claims, 6 Drawing Sheets

ELECTRONIC STILL CAMERA

This application is a continuation of application Ser. No. 07/416,979, filed Oct. 4, 1989, now abandoned.

BACKGROUND OF THE INVENTION

1. Field of the Invention

The present invention relates to an electronic still camera and, more particularly, to an electronic still camera with a photographing optical system and a finder optical system disposed separately from each other.

2. Description of Related Art

It is known that electronic still cameras are designed to record image data electrically by viewing an image of an object on a photographing element (photoelectric converting element), such as CCD or the like, in place of silver salt film. The electronic still camera can be of a single-lens reflex type or of a lens shutter type. Particularly of interest is a type in which the photographing optical system is separately disposed from the finder optical system, but cameras of these two types are being commercialized. The lens shutter type camera with the photographing optical system disposed separately from the finder optical system cannot avoid a parallax. As the magnitude of the parallax depends upon the distance between the optical axis of the photographing optical system and the optical axis of the finder optical system, the parallax gets smaller as the optical axis of the photographing optical system approaches closer to that of the finder optical system. For the electronic still camera, however, a board with photographing elements such as a CCD, etc., mounted thereon (hereinafter referred to as photographing element board) is too large. Thus the size of the photographing element board of a conventional electronic camera structure places restrictions upon the distance by which the photographing optical system can approach the finder optical system, thus setting limits to making the parallax smaller.

SUMMARY OF THE INVENTION

The present invention has the object to provide an electronic still camera with its photographing optical system disposed separately from its finder optical system, which is capable of reducing the parallax without being restricted due to the large size of its photographing element board.

The present invention has another object to provide an electronic still camera with a driving unit for a zoom finder optical unit, in which its photographing optical system and its finder optical system are constituted in each case by a zoom lens.

In order to achieve the objects, the present invention involves an electronic still camera of a lens shutter type, in which an optical path of its finder optical unit is subject to refraction.

More specifically, the electronic still camera according to the present invention is characterized in that the optical path of the finder optical unit disposed separately from the photographing optical system comprises a forward optical path parallel to the photographing optical system and near to the optical axis of the photographing optical system, a rearward optical path positioned away from the optical axis of the photographing optical system farther than the forward optical path, and a deflection optical path connecting the forward optical path to the rearward optical path so that the deflected optical path of the finder optical unit is located at a position forward of the photographing element to be located at a position rearward of the photographing optical system.

This arrangement permits the forward optical path of the finder optical unit to approach to the photographing optical path, thereby reducing the parallax, and the rearward optical path thereof to be away from the photographing optical path, thereby ensuring sufficient space for mounting a large size of the board with the photographing elements mounted thereon. In other words, the electronic still camera according to the present invention can satisfy the requirements that cannot be satisfied by the conventional electronic still camera, i.e., requirements for making the parallax smaller and for enlarging the board.

The present invention further provides an electronic still camera comprising the photographing optical system and the finder optical system, which are both constituted by zoom lenses. The finder optical system is further provided with a zoom finder driving unit for driving the zoom finder optical unit, which comprises a magnification varying movable lens located in the forward optical path for varying finder field by a movement in the optical axis direction, and a cam plate portion located at a side portion of the forward optical path. A finder cam plate having a rectangular driving portion disposed integrally with the cam plate portion so as encircle the deflected optical path, a driving mechanism for driving the finder cam plate in a vertical direction through the rectangular driving portion, and a cam mechanism for transferring the magnification varying movable lens to a given position in accordance with the vertical movement of the finder cam plate are also provided.

The rectangular driving portion of the finder cam plate is provided at its rearward portion with a rack extending in a vertical direction, the rack being disposed so as to be in mesh with a pinion of the driving mechanism located at a rearward portion of the deflected portion of the finder optical unit, thereby providing a compact electronic still camera.

The electronic still camera can be made thinner by allowing the deflected optical path portion of the rectangular driving portion of the finder optical unit to be transferred symmetrically in a vertical direction.

Driving the zoom photographing optical system in synchronization with the zoom finder optical unit can be effected by moving a zooming cam ring of the zoom-photographing optical system in association with another pinion of the driving mechanism of the zoom finder optical unit.

BRIEF DESCRIPTION OF THE DRAWINGS

The present invention will be described below in detail with reference to the accompanying drawings; in which.

DETAILED DESCRIPTION OF THE PREFERRED EMBODIMENTS

A zoom-photographing lens 11 is provided at its outer periphery with a zooming cam ring 12 on which two zooming cam grooves 13 and 14 for a movable lens are formed. Into the zooming cam grooves 13 and 14 are inserted guide pins 16 and 17 disposed integrally with a front lens group (not shown) and a rear lens group (not shown), respectively. On the outer periphery of the cam ring 12 is fixed a sector gear 19 through set screws 18. The sector gear 19 is provided with an elongated hole 19a extending in its peripheral direction and it is disposed so as to enable its angular position relative to the cam ring 12 to be adjusted within a scope of an effective length of the elongated hole 19a.

At a side portion of the zoom-photographing lens 11 a zoom finder unit 20 is located with an optical path which is refracted in the form of a planar crank in order to reduce the parallax as it approaches to the zoom-photographing lens 11 as close as possible and to ensure space at a position rearward of the zoom-photographing lens 11. More specifically, the zoom finder unit 20 comprises a forward optical path 20a located at a position forward of and close to the zoom-photographing lens 11, a rearward optical path 20b located away from the zoom-photographing lens 11, and a deflected optical path 20c connecting the forward optical path 20a to the rearward optical path 20c. The forward and rearward optical paths 20a and 20b are parallel to the optical axis of the zoom-photographing lens 11 and perpendicular to the deflected optical path 20c.

Figure 6:
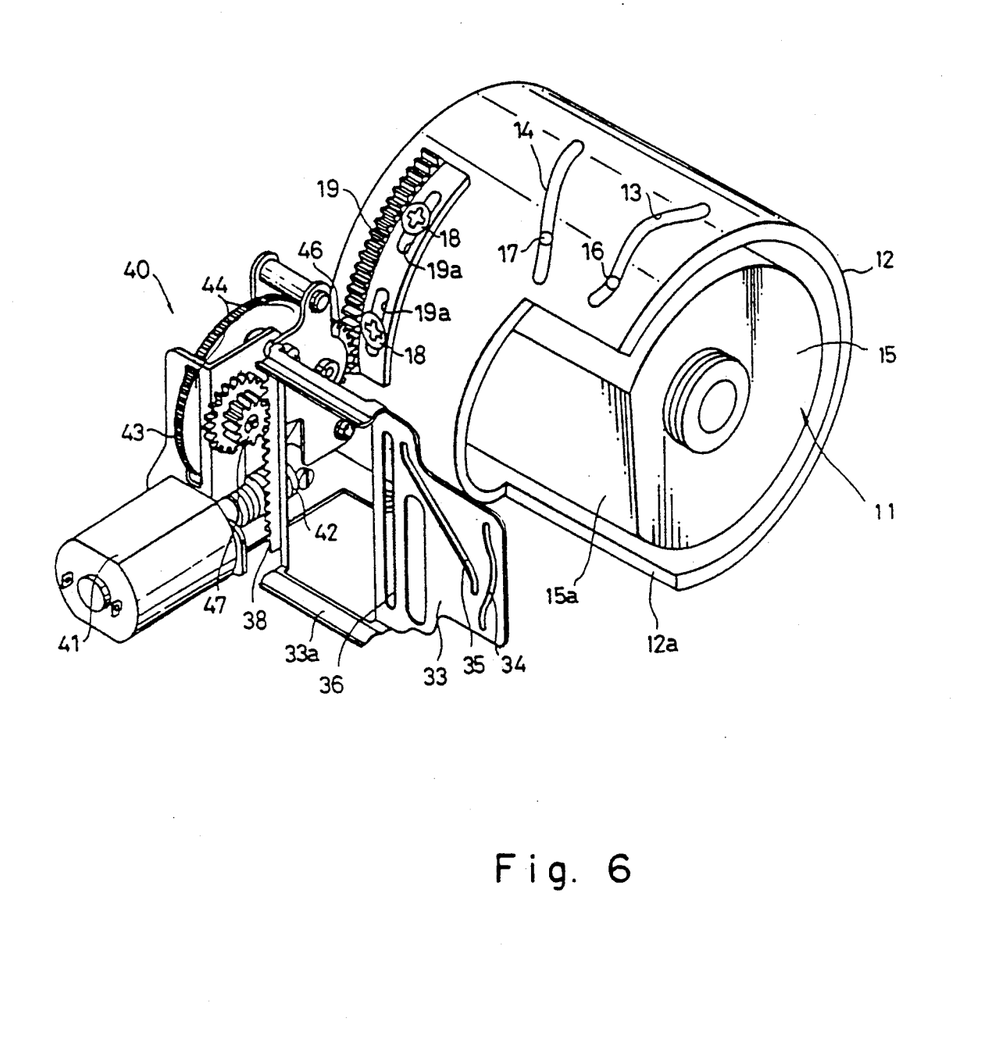
FIG. 6 is a perspective view showing a driving mechanism portion with the zoom finder optical unit excluded from the camera shown in FIG. 1.

The cam ring 12 is provided on a portion of its forward peripheral surface with a cut-away portion 12a (FIG. 6), which allows an insertion of the forward optical path 20a, thereby enabling the zoom-photographing lens 11 to approach the optical axis of the forward optical path 20a.

Figure 1:
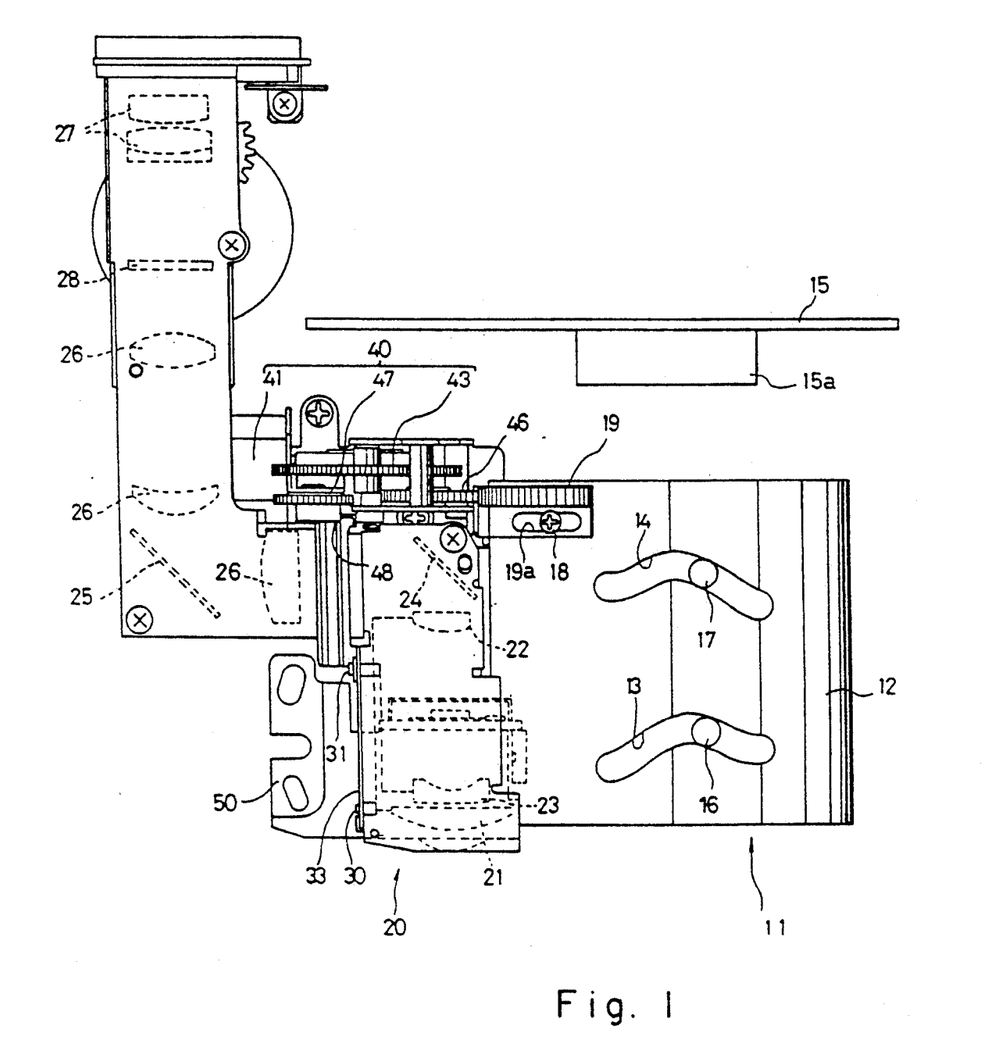
FIG. 1 is a plan view of an electronic still camera according to the present invention.

As shown in FIG. 1, the forward optical path 20a is provided in its inside with movable lenses 21 and 22 arranged so as to be movable integrally with each other, and another movable lens 23. At the connection of the forward optical path 20a to the refracted optical path 20c a reflecting mirror 24 is disposed and is capable of deflecting the optical path at 90 degrees. In the deflected optical path 20c an objective optical unit 26 is disposed, and a reflecting mirror 25 capable of deflecting the optical path at 90 degrees is disposed at a connection of the rearward optical path 20b to the deflected optical path 20c. The rearward optical path 20b is provided with an objective optical system 26, a field frame 28 and an eyepiece 27.

The zoom finder unit 20 having the above structure comprises a real image finder of a relay lens type, thus enabling an observation of an aerial image formed by the movable lenses 21 to 23, inclusive, as an erect image through the reflecting mirrors 24 and 25, the objective optical system 26, and the eyepiece 27.

The advantage underlying the present invention resides in that the optical path of the zoom finder optical unit 20 is deflected and that the deflected optical path 20c is located at a position forward of the photographing element board which is located at a position rearward of the zoom photographing lens 11. On the photographing element board 15 is fixed photographing element 15a located on the optical axis of the zoom-photographing lens 11. Setting the position of the optical path 20c permits a large-size board to be used as the photographing element board 15, thereby enabling a simple structure of an image processing circuit to be mounted on the board.

The movable lenses 21, 22 and 23 are transferrable along their respective given tracks, thereby changing the magnification of the finder. To the support members (movable lens frames) of the movable lenses 21 and 22 are mounted driving pins 30, and a driving pin 31 is mounted to a support member (movable lens frame) of the movable lens 23. The driving pins 30 and 31 are inserted into zoom cam grooves 34 and 35, respectively, of the finder cam plate 33 located at a side surface of the forward optical path 20a of the zoom finder unit 20. Reference symbols 32a and 32b denote straight-forwardly extending guide grooves formed in the optical axis direction on a casing for the forward optical path 20a, into which the driving pins 30 and 31 are inserted, respectively.

Figure 2:
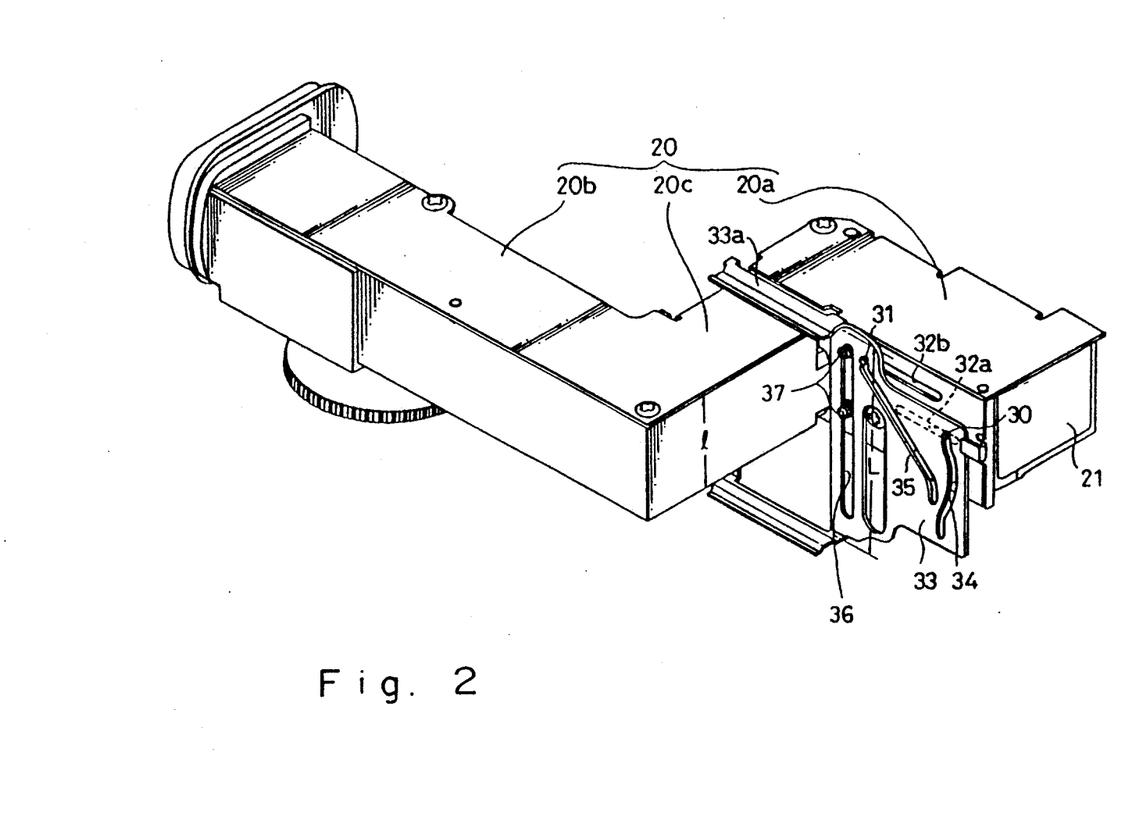
FIG. 2 is a perspective view with a distance measuring unit and a zoom-photographing lens excluded from the camera shown in FIG. 1.
Figure 3:
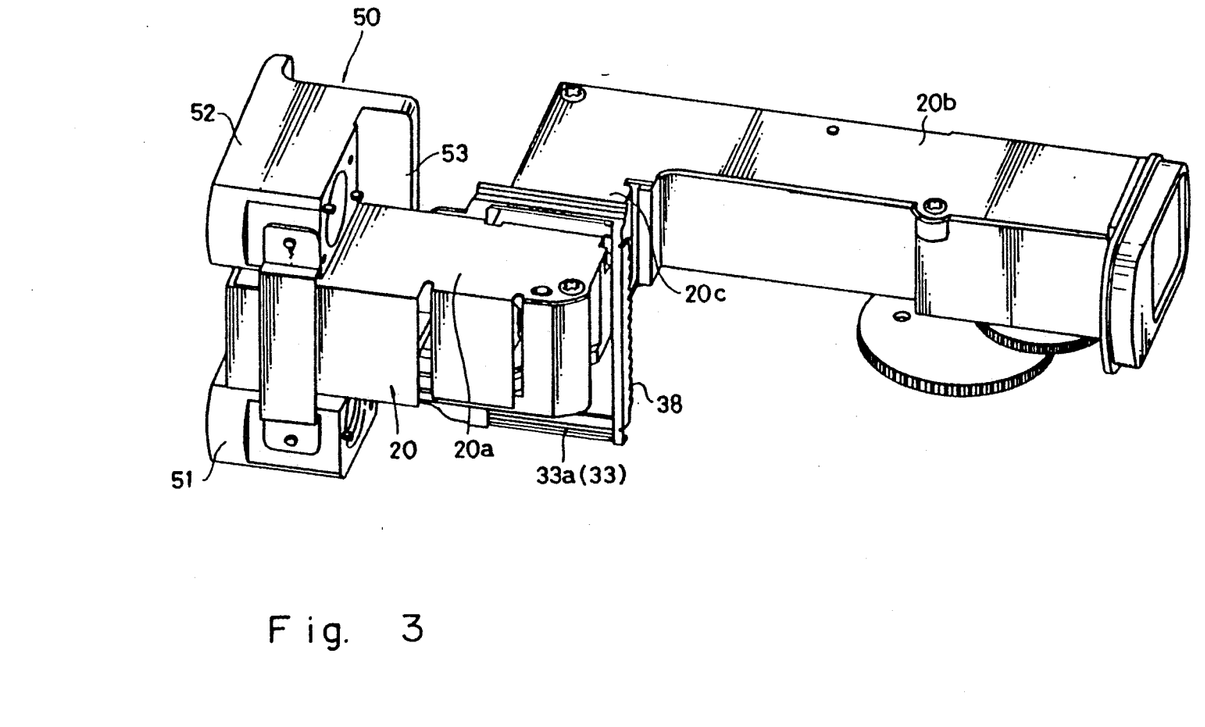
FIG. 3 is a perspective view looking from the rear surface side with the zoom-photographing lens excluded from the camera shown in FIG. 1.
Figure 4:
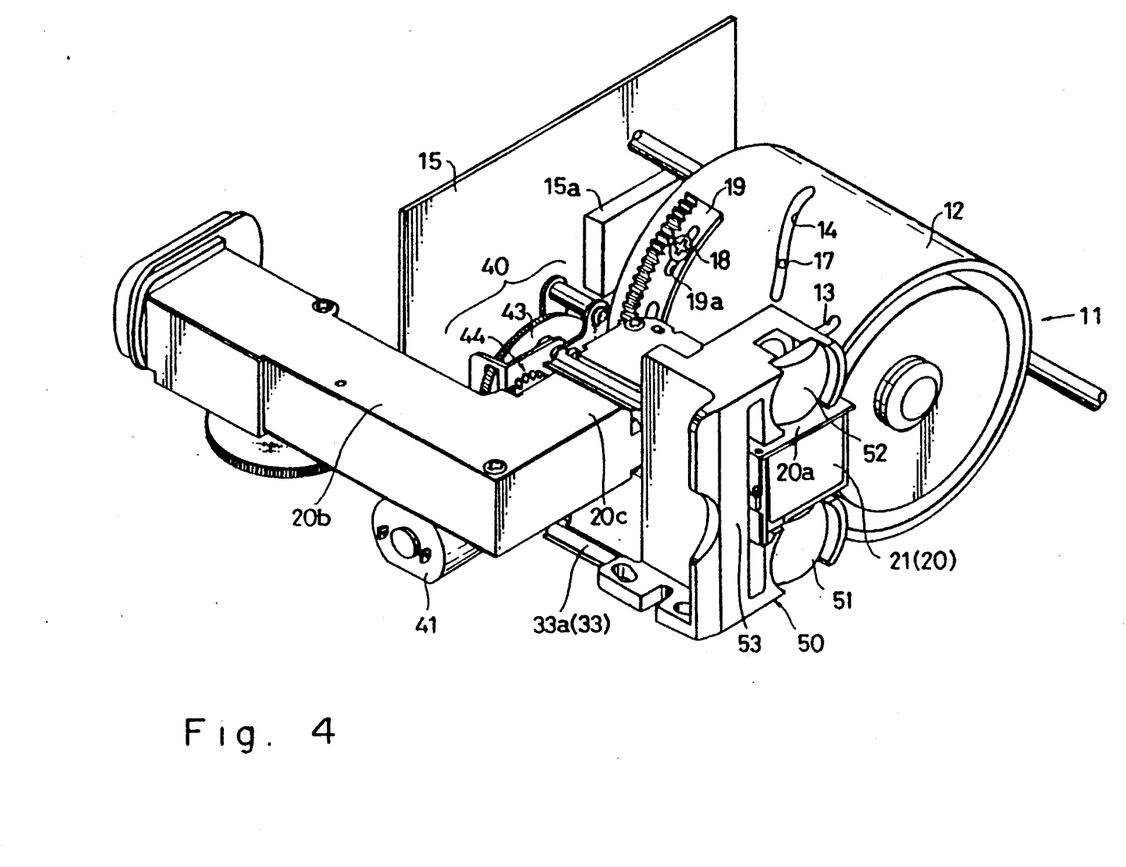
FIGS. 4 and 5 are a perspective view and a plan view, respectively, with the zoom-photographing lens excluded from the camera shown in FIG. 1.
Figure 5:
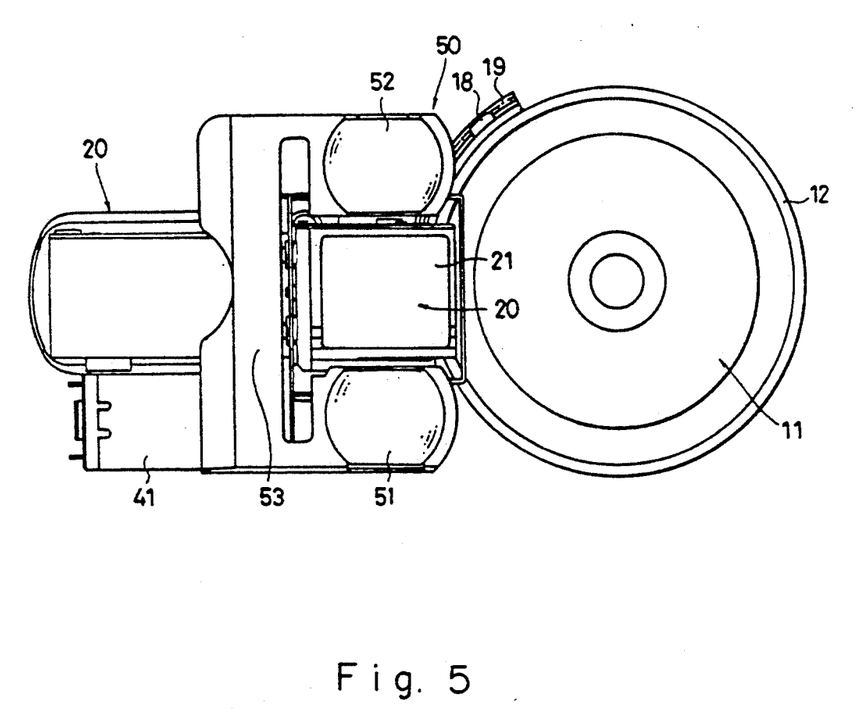

The finder cam plate 33 is provided at its rearward portion with a rectangular driving unit 33a enclosing the refracted optical path 20c, and a rack 38 is formed in a longitudinal direction at a rearward portion of the rectangular driving unit 33a. The finder cam plate 33 is provided with the guide groove 36 extending in a vertical direction and the guide pins 37 mounted on the side surface of the forward optical path 20a is engaged with the guide groove 36 in order to regulate a vertical movement of the finder cam plate 33. An inner dimension L (FIG. 2) in the vertical direction of the rectangular driving portion 33a of the finder cam plate 33 is greater than a thickness l of the deflected optical path 20c, and thus vertical movement is allowed by the difference between the inner dimension L and the thickness l. The rack 38 is disposed such that the finder cam plate 33 is movable vertically in a substantially symmetrical manner from the center of the thickness direction of the zoom finder unit 20.

To a back of the deflected optical path 20c of the zoom finder unit 20 is fixed a driving mechanism unit 40 which can transmit rotation of a reversible driving motor 41 through a worm wheel 43 and a gear train 44, which includes at least one gear (not shown) which is driven by worm wheel 43 to mesh with and drive a pair of pinions 46 and 47. The pinion 46 is in mesh with the sector gear 19 of the cam ring 12, and the pinion 47 is in mesh with the rack 38 of the finder cam plate 33.

At an end portion of the forward optical path 20a of the zoom finder unit 20 is disposed a distance measuring unit 50 in which a light emitting portion 51 and a light receiving portion 52 are connected integrally to each other by means of a connecting arm 53. The distance measuring unit 50 is for an active type of sensing a distance from an object by emitting a distance measuring light (infrared rays) from the light emitting portion 51 to the object and receiving a reflected light from the object by the light receiving portion 52. Although a large number of such distance measuring units are known, the present invention uses a unit in which the zoom-photographing lens 11 and the zoom finder unit 20 are disposed side-by-side, namely, in a transverse direction of the camera, and the light emitting portion 51 is disposed at a position downwardly of the forward optical path 20a of the zoom finder unit 20 and the light receiving portion 52 is disposed at a position upwardly thereof, thereby minituarizing the size of the camera.

The above arrangement of the electronic still camera according to the present invention permits the zoom-photographing lens 11 to approach the optical axis of the forward optical path 20a of the zoom finder unit 20 so that the parallax can be made extremely small. Furthermore, the rearward optical path 20b located at a side portion of the photographing element board 15 is disposed away from the board 15 through the deflected optical path 20c so that the photographing element board 15 can be made sufficiently large.

Operation of the electronic still camera having the structure as has been described hereinabove will be described hereinafter. The reversible driving motor 41 of the driving mechanism unit 40 is reversibly driven by number of revolutions (angle) in accordance with the distance signal from the distance measuring unit 50. This reversible movement simultaneously rotates the pinions 46 and 47, and the rotation of the pinion 46 causes the cam ring 12 to rotate with the aid of the sector gear 19. The reversible rotation of the cam ring 12 permits a transfer of the front lens group and the rear lens group in the optical axis direction through the zooming cam grooves 13 and 14, respectively, thus changing a distance therebetween and thus zooming the zoom-photographing lens 11. The reversible rotation of the pinion 47 allows a vertical movement of the finder cam plate 33, thereby moving the movable lenses 21 to 23, inclusive, in the optical axis direction by means of the zoom cam grooves 34 and 35 and thus zooming the zoom finder unit 20.

The zoom-photographing lens 11 and the zoom finder unit 20 are adjusted so as to substantially relate the photographing area of the zoom-photographing lens 11 with the finder field of the zoom finder unit 20. In other words, this adjustment can be made by adjusting the relative angular position of the sector gear 19 relative to the cam ring 12 within a range of the effective length of the peripherally elongated hole 19a.

As has been described hereinabove, the electronic still camera according to the present invention is provided with a finder optical unit whose optical path is deflected so as to allow a forward portion of the finder optical path to approach the photographing optical system and, at the same time, to allow a rearward portion of the finder optical path, at which the photographing element board is disposed, to be away from the photographing optical system through the deflected optical path, so that the parallax can be made small without limiting the size of the photographing element board. This also can provide a large degree of freedom for a size of the board, thereby easing design of the circuits.

Furthermore, the present invention can readily provide a compact structure of a driving unit for driving the finder optical unit by taking advantage of the structural characteristic in which the zoom-photographing optical system and the finder optical unit are of the type that are zoomed while the optical path of the finder optical unit is, thereby miniaturizing the camera itself. The disposition of the finder cam plate so as to vertically move with respect to the deflected optical path of the finder optical unit in a substantially symmetrical manner can also serve to make the camera thinner.

We claim:

1. A camera comprising:
   a photographing optical system;
   a photographing element located at a surface of said photographing optical system on which an image is formed; and
   an erect image finder optical unit disposed separately from said photographing optical system;
   said erect image finder optical unit defining a fixed optical path, and wherein the optical path of said erect image finder optical unit is defined within a plane and comprises a forward optical path disposed in parallel to said photographing optical system and at a position close to the optical axis thereof; a rearward optical path disposed at a position spaced from the optical axis of said photographing optical system farther than the forward optical path and on the same side of said photographing optical system; and a deflected optical path for connecting the forward optical path to the rearward optical path, the deflector optical path disposed at a position forward of said photographing element,
   said photographing optical system comprising a camera body, said erect image finder optical unit comprising a view finder which is integral with and internal of said camera body.

2. A camera according to claim 1, wherein said photographing element is supported on a photographing element board of a size larger than said photographing element.

3. A camera according to claim 1, wherein said photographing optical system and said finder optical unit each comprise a zoom lens.

4. A camera according to claim 3, wherein said finder optical unit is of a zoom lens type and comprises a magnification varying movable lens located in the forward optical path for changing a field of a finder by a movement in an optical axis direction; a finder cam plate having a cam plate portion located at a side portion of the forward optical path and a rectangular driving portion disposed integrally with said cam plate portion and enclosing the deflected optical path; a driving mechanism for driving said finder plate through said rectangular driving portion in a vertical direction; and a cam mechanism for transferring said magnification varying movable lens to a given position in accordance with a vertical movement of the finder cam plate.

5. A camera according to claim 4, wherein said rectangular driving portion of said finder cam plate is provided at its rearward portion with a rack extending in a vertical direction and said rack is in mesh with a pinion of said driving mechanism located at a rearward portion of the deflected optical path of the finder optical unit.

6. A camera according to claim 4, wherein said rectangular driving portion of said finder cam plate moves in a direction upwardly or downwardly of the deflected optical path of said finder optical unit in a substantially symmetrical manner.

7. A camera according to claim 5, wherein said driving mechanism is provided with an additional pinion, said additional pinion rotates a cam ring for zooming the photographing optical system.

8. A camera according to claim 1, said forward optical path, said deflected optical path, and said rearward optical path defining a generally crank shaped finder optical path.

9. A camera according to claim 1, said erect image finder optical unit comprising means forming an erect image when viewed from a side of the camera remote from a photographing subject.

10. A camera according to claim 1, said erect image finder optical system comprising means forming an erect image when viewed through the rearward extending optical path.

11. A camera comprising:
a photographing optical system;
a photographing element located at a surface of said photographing optical system on which an image is formed; and
a finder optical unit disposed separately from said photographing optical system; said finder optical unit comprising means for forming an erect image of a subject when viewed from a side of the camera remote from the subject;
wherein an optical path of said finder optical unit comprises a forward optical path disposed in parallel to said photographing optical system and at a position close to the optical axis thereof; a rearward optical path disposed at a position spaced from the optical axis of said photographing optical system farther than the forward optical path and on the same side of said photographing optical system, and a deflected optical path for connecting the forward optical path to the rearward optical path, said photographing optical system comprising a camera body, said erect image finder optical unit comprising a view finder which is integral with and internal of said camera body, said erect image finder optical unit defining a fixed optical path, and wherein the optical path of said erect image finder optical unit is defined within a plane.

12. The camera according to claim 11, wherein said finder optical unit comprises a movable magnifying lens located in the forward optical path for changing field of view of the finder by a movement in the optical axis direction.

13. The camera according to claim 11, wherein said photographing optical system and said finder optical system each comprise a zoom lens.

14. A camera comprising:
a photographing optical system;
a photographing element located at a surface of said photographing optical system on which an image is formed; and
a finder optical unit disposed separately from said photographing optical system; said finder optical unit comprising means for forming an erect image viewed through the rearward extending optical path;
wherein an optical path of said finder optical unit comprises a forward optical path disposed in parallel to said photographing optical system and at a position close to the optical axis thereof, a rearward optical path disposed at a position spaced from the optical axis of said photographing optical system farther than the forward optical path and on the same side of said photographing optical system, and a deflected optical path for connecting the forward optical path to the rearward optical path, said photographing optical system comprising a camera body, said erect image finder optical unit comprising a view finder which is integral with and internal of said camera body, said erect image finder optical unit defining a fixed optical path, and wherein the optical path of said erect image finder optical unit is defined within a plane.

15. The camera according to claim 14, wherein said finder optical unit comprises a movable magnifying lens located in the forward optical path for changing field of view of the finder by a movement in the optical axis direction.

16. The camera according to claim 12, wherein said photographing optical system and said finder optical system each comprise a zoom lens.

17. The camera of claim 1, wherein said photographing element comprises at least one CCD element.

18. The camera of claim 11, wherein said photographing element comprises at least one CCD element.

19. The camera of claim 14, wherein said photographing element comprises at least one CCD element.

* * * * *